United States Patent [19]

Early

[11] 4,162,722

[45] Jul. 31, 1979

[54] APPARATUS FOR COLLATING CANS AND OTHER ARTICLES

[76] Inventor: Leon Early, Mistletoe Farm, Wendling, Norwich, Norfolk, England

[21] Appl. No.: 757,542

[22] Filed: Jan. 7, 1977

[30] Foreign Application Priority Data

Jan. 10, 1976 [GB] United Kingdom .................. 906/76

[51] Int. Cl.² ............................................. B65G 47/26
[52] U.S. Cl. .................................... 198/418; 198/434; 53/536; 414/108; 414/109
[58] Field of Search ....................... 198/418, 434, 453; 214/1 BS, 1 BV, 1 BT, 6 H, 6 FS, 6 P, 300–303; 53/159, 163, 164, 535, 536

[56] References Cited

U.S. PATENT DOCUMENTS

| | | | |
|---|---|---|---|
| 2,858,009 | 10/1958 | Bainbridge | 198/434 |
| 3,493,126 | 2/1970 | Forshier et al. | 214/6 FS |
| 3,604,551 | 9/1971 | Fink | 198/453 |
| 3,612,299 | 10/1971 | Shaw et al. | 214/6 P |
| 3,664,087 | 5/1972 | Choate et al. | 214/6 P |
| 3,718,223 | 2/1973 | Meissner | 214/6 P |
| 3,955,688 | 5/1976 | Jones | 214/1 BT |

Primary Examiner—Joseph E. Valenza
Attorney, Agent, or Firm—Louis J. Pizzanelli

[57] ABSTRACT

A collating apparatus for cans or other articles of circular cross-section comprises a plurality of conveyor belts running parallel to one another and a constraining wall inverted just above the belts serving to collate the cans into a nested configuration, i.e., with transverse lines of cans at approximately an angle of 60° to one another whereby a maximum number of cans can be accommodated in a given space. The constraining wall has a transverse portion facing an intake throat aided by zig-zag portions which build up a triangle pattern until the wall space has been filled. A circle of cans is then lifted magnetically.

9 Claims, 1 Drawing Figure

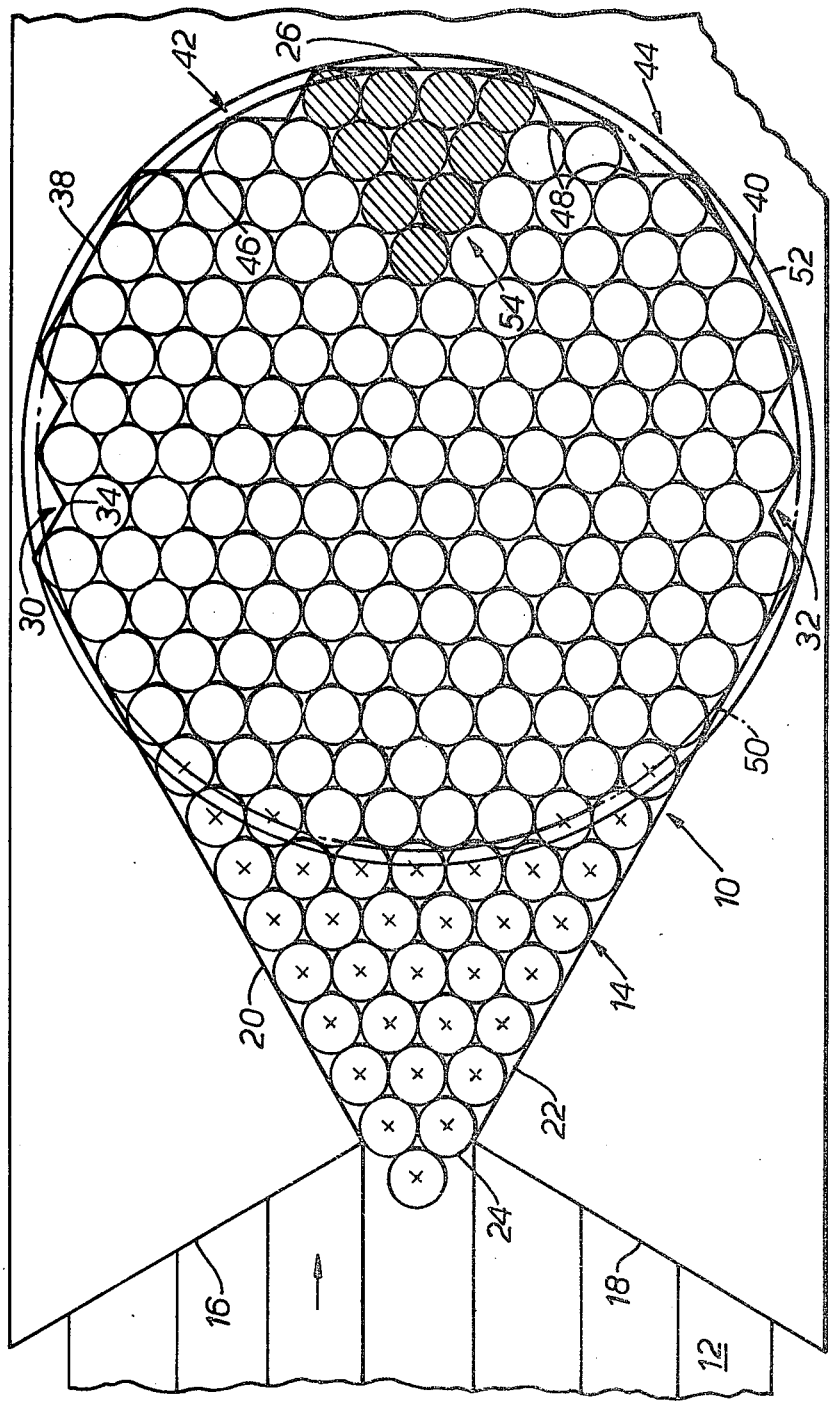

APPARATUS FOR COLLATING CANS AND OTHER ARTICLES

BACKGROUND OF THE INVENTION

1. Field of the Invention

This invention relates to apparatus for collating cans and other articles of circular section into required patterns or configurations.

2. Description of the Prior Art

It is a requirement of many can-handling plants that at certain stations of such plants a large number of cans shall be rapidly and accurately collated into required forms. Despite the regularity in the size and shape of cans and similar containers, many attempts have been made to provide successful, but simple apparatus which will collate a large number of cans accurately into a required form, such as circular.

Collating apparatus has been proposed which involves a plurality of separate, parallel-extending, conveyor belts which lead a succession of cans to a stop which may, for example, be circular or semi-circular. However, this prior apparatus suffers from defects in that the collated pattern is not always as desired. If cans are arranged in aligned rows extending at 90° to one another, the voids between the cans are substantially larger than if the cans are arranged so that the rows lie at approximately 60° to one another or in other words so that any three cans are so arranged that each can is partially "nested" between the other cans of the three. The term "nested" will be used herein to refer to this arrangement.

SUMMARY OF THE INVENTION

According to the present invention there is provided collating apparatus for cans or other articles comprising conveyor means and constraining means disposed above the conveyor means, said constraining means serving to constrain articles delivered by the conveyor means into the area defined by the constraining means to assume a nested configuration when collated to fill said area.

Further according to the present invention there is provided collating apparatus for cans or other generally circular-sectioned articles comprising conveyor means and constraining means mounted above and spaced from the conveying means, said constraining means having a generally pear-shaped configuration and serving in use to collate the articles into a nested configuration.

Still further according to the present invention there is provided collating apparatus for cans or other generally cylindrical articles comprising a plurality of parallel conveyors, differential speed drive means for the conveyors, constraining means mounted above the conveyors having a generally pear-shaped configuration and a central portion extending transversely to the direction of travel of the conveyors and arranged in conjunction with a central one of the conveyors to build up a triangular group of articles preferentially on initial operation of the apparatus, the over-all configuration of the constraining means serving to nest the articles.

BRIEF DESCRIPTION OF THE DRAWINGS

Collating apparatus embodying the invention will now be described, by way of example, with reference to the accompanying diagrammatic drawing, the sole FIGURE of which is a plan view of the apparatus showing certain cans after they have been collated in the apparatus and other cans in the process of collating.

DESCRIPTION OF THE PREFERRED EMBODIMENT

The apparatus 10 is intended to operate with the aid of a conveyor belt 12 which may be of unitary form or, preferably, comprises a plurality of parallel individual belts arranged, closely-spaced, side-by-side. If a plurality of separate belts is employed it is desirable to run the central belt or belts at a higher speed than the belts lying laterally outwardly thereof. If the latter drive arrangement is adopted, the speeds of the conveyors outwardly of the central belt or belts will be driven so that corresponding belts travel at the same speed. The speeds diminish progressively outwardly. Appropriate drive means will, of course, be provided.

The collating apparatus further includes wall lengths 14 (or other constraining means), for example of sheet metal, mounted just above or in other words spaced from, the surface of the upper runs of the conveyor or conveyors and includes adjacent wall lengths 16, 18, 20, 22 which together define a convergent-divergent entry throat 24 which leads to the interior of the area defined by the wall lengths. The throat 24 lies opposite to a transverse, centrally-disposed, end wall length or portion 26 capable of accommodating in abutting or substantially abutting relationship four cans of the size for which the apparatus is constructed. The throat has a width equal to that of the central conveyor and to two of the cans or other articles.

To obtain maximum use of any given space in canning apparatus rows of cans formed should not lie at 90° to one another but at approximately 60°, in other words the rows are in skewed relationship rather than in the form of a rectangular grid. To ensure this skewed or nested relationship and that an approximately circular configuration is finally formed at the completion of a collecting operation, opposed pairs of wall lengths starting from the inclined wall lengths 20, 22 include zig-zag wall lengths 30, 32 (first zig-zag lengths) the individual parts of which lie at an angle of approximately 120° to one another and these each form two inwardly-directed, vertical, edges 34, 36. The individual parts extend at 30° to the direction of travel of the conveyors. Two further opposed, rectilinear wall lengths 38, 40 follow, each inclined convergingly at 30° to the direction of movement of the conveyor belts 12 and arranged to accommodate four abutting or at least substantially abutting cans and these two opposed wall lengths 38, 40 are each joined to a further zig-zag set of wall lengths (second zig-zag lengths) 42, 44 alternate ones of which are transverse to the direction of travel of the conveyor belts and at 30° thereto. Again, each set of zig-zag wall lengths defines two inwardly-directed vertical edges 46, 48. Each zig-zag recess accommodates one can only.

The over-all form defined by the wall lengths is very approximately that of a pear and as will be apparent, the cans, when finally collated, form approximately a circular configuration apart from the cans adjacent the throat marked X.

A lifting magnet is represented by an inner annular chain line 50 and the basket to be filled by an outer annular line 52.

In operation, when the apparatus is initially put into use cans will enter through the throat 24 and will travel down the central conveyor or centre portion if a unitary conveyor is used until they reach the transverse wall length 26 which accommodates the first four cans. As the cans continue to arrive, a triangular group 54 (cross-hatched cans) is built up on the basis of the first four cans and subsequent cans will travel down the free faces of the triangular group of cans until the leading one encounters one of the edges 46, 48. When the rows extending from the edges 46, 48 have been completed, further rows are formed and the leading cans abut against the wall lengths 42, 44 and the edges 46, 48.

The next rows are then formed with the leading can abutting against another of the edges 46, 48 of the second sets of zig-zag wall lengths 42, 44 and the collating process continues until it is completed as shown in the sole FIGURE of the drawings. The first sets of zig-zag lengths 30, 32 ensure that after a number of rows have been built up, the regularity of the nested configuration is maintained. The precise manner in which the space defined by the wall means is filled will depend upon the relative speed of the central conveyor to the speed of the outer conveyors. Again, the manner in which the cans are collated will differ if only a single conveyor is used, but for all constructions, any given can will always travel as far forward as possible.

When the apparatus has been filled a circular magnetic or other type of pick-up mechanism removes a circle of cans leaving behind those marked with an X and immediately the circular collation of cans has been removed those remaining move down along the conveyor belt or belts and the process is repeated. The can collation is released in a retort basket having a funnel like opening. If the central conveyor portion or portions is/are driven at a higher speed than the remainder, the triangle will form preferentially.

As will be apparent, the configuration of the wall means is such that the cans are constrained to form regularly built-up nested rows lying at approximately 60° to one another thus reducing the voids to the theoretical minimum and the general configuration of the wall means is such that there is little or no risk of any given can jamming and thus causing an irregular pattern formation. The individual wall lengths are symmetrical about the centre line of the centre conveyor. The cans are preferably of such a size that when collated they are not over-tightly packed since otherwise there is an appreciable risk that the peripheral lip of one can will ride up the lip of the next adjacent can. This is important since the upper over-all surface of the cans would not lie in a plane and pick-up by the magnet would be adversely affected.

The lengths of wall have dimensions specific to the size of can to be collated, whereas, within limits the conveyor belt or belts will remain the same irrespective of can size.

Although the best mode contemplated for carrying out the present invention has been herein shown and described, it will be apparent that modification and variation may be made without departing from what is regarded to be the subject matter of the invention as defined in the appended claims.

What is claimed is:

1. In a collating apparatus for grouping and nesting articles of circular cross-section for subsequent handling, said apparatus having:

conveyor means for advancing a plurality of said articles in a direction of travel,
   converging wall means disposed above said conveyor to engage said articles, said converging wall means being spaced to define a throat therebetween through which the articles must pass, and,
   group-forming wall means downstream of said throat to and against which articles are conveyed by said conveyor means;
   the improvement comprising:
   said group-forming wall means having a central rectilinear wall length wider than said throat against which articles initially passing through said throat engage and abut, said wall length being disposed substantially perpendicular to said conveyor means direction or travel,
   said central wall length on each end thereof connecting with pocket-forming wall lengths having irregular article-engaging surfaces and extending generally laterally and upstream of said conveyor means direction of travel, thereby to define an overall generally semi-circular group-forming wall means, and,
   diverging wall lengths extending downstream from said throat and connecting respectively with the upstream ends of said pocket-forming wall lengths.

2. Apparatus according to claim 1 wherein the conveyor means comprises a plurality of parallel individual conveyors and there is provided drive means for the conveyors arranged to drive the individual conveyors at different speeds, a central one of the conveyors being aligned with said throat and operable at a higher speed and conveyors outwardly of the central conveyor being operable at progressively slower speeds with corresponding conveyors on each side of the central conveyor being operable at the same speed.

3. Apparatus according to claim 2 wherein the throat of the throat defining means has a width equal to the width of the central conveyor.

4. Collating apparatus according to claim 1 wherein said diverging wall lengths comprise two opposed symmetrical rectilinear wall lengths extending at 30° to the direction of travel of said conveyor means, and,
   said pocket-forming wall lengths comprise two supposed symmetrical zig-zag wall lengths connected to downstream ends of said rectilinear wall lengths, two opposed symmetrical rectilinear wall lengths extending at 30° to the said direction to generally converge, and, two further opposed symmetrical zig-zag portions each connecting the downstream end of one of the converging rectilinear wall lengths and one end of said central wall length.

5. Apparatus according to claim 4 wherein the central wall length is arranged to provide an abutment for an even number of articles and each zig-zag length defines at least one 120° apex accommodating one article only.

6. Apparatus according to claim 4, wherein the first mentioned zig-zag wall lengths have parts extending at 30° to said direction.

7. Apparatus according to claim 4, wherein the second-mentioned zig-zag wall lengths have parts extending transversely to said direction and at 30° to said direction.

8. Apparatus according to claim 2 wherein said central wall length and said pocket-forming wall lengths in conjunction with the central one of said conveyors are arranged to cause the initial formation of a triangular group of articles.

9. Apparatus according to claim 4 wherein each converging rectilinear wall length is arranged to accommodate four articles.

* * * * *